US011152158B2

United States Patent
Fukui et al.

(10) Patent No.: US 11,152,158 B2
(45) Date of Patent: Oct. 19, 2021

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Hitoshi Fukui, Nara (JP); Hiroshi Kojima, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 16/430,216

(22) Filed: Jun. 3, 2019

(65) Prior Publication Data

US 2019/0287729 A1 Sep. 19, 2019

Related U.S. Application Data

(63) Continuation of application No. PCT/JP2017/039498, filed on Nov. 1, 2017.

(30) Foreign Application Priority Data

Dec. 28, 2016 (JP) .............................. JP2016-256146

(51) Int. Cl.
*H01G 9/028* (2006.01)
*H01G 9/15* (2006.01)
*H01G 9/00* (2006.01)

(52) U.S. Cl.
CPC ............... *H01G 9/028* (2013.01); *H01G 9/15* (2013.01); *H01G 9/0036* (2013.01)

(58) Field of Classification Search
CPC ........... H01G 9/025; H01G 9/028; H01G 9/15
See application file for complete search history.

(56) References Cited

U.S. PATENT DOCUMENTS

2015/0262754 A1* 9/2015 Nagashima .......... H01G 9/0036
427/79
2017/0338047 A1* 11/2017 Bunha .................. H01G 9/0036

FOREIGN PATENT DOCUMENTS

| JP | 2006-287182 | 10/2006 |
|---|---|---|
| JP | 2014-067949 | 4/2014 |

OTHER PUBLICATIONS

International Search Report of PCT application No. PCT/JP2017/039498 dated Jan. 23, 2018.

* cited by examiner

*Primary Examiner* — Eric W Thomas
(74) *Attorney, Agent, or Firm* — McDermott Will and Emery LLP

(57) ABSTRACT

An electrolytic capacitor includes an anode body, a dielectric layer disposed on the anode body, and a solid electrolyte layer disposed on the dielectric layer. The solid electrolyte layer includes a conductive polymer, a polyanion, and an alkali component. The alkali component includes two or more kinds of alkali compound.

5 Claims, 1 Drawing Sheet

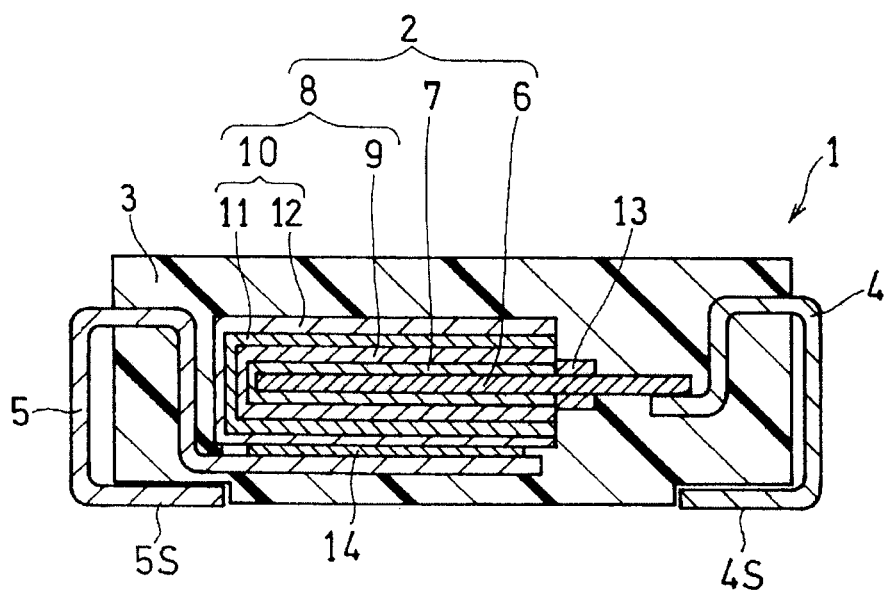

ELECTROLYTIC CAPACITOR AND METHOD FOR MANUFACTURING SAME

RELATED APPLICATIONS

This application is a continuation of the PCT International Application No. PCT/JP2017/039498 filed on Nov. 1, 2017, which claims the benefit of foreign priority of Japanese patent application No. 2016-256146 filed on Dec. 28, 2016, the contents all of which are incorporated herein by reference.

BACKGROUND

1. Technical Field

The present disclosure relates to an electrolytic capacitor including a solid electrolyte layer containing a conductive polymer, and a method for manufacturing the electrolytic capacitor.

2. Description of the Related Art

As capacitors having a small size, a large capacitance, and low equivalent series resistance (ESR), promising candidates are electrolytic capacitors including an anode body, a dielectric layer disposed on the anode body, and a solid electrolyte layer disposed on the dielectric layer and containing a conductive polymer.

Unexamined Japanese Patent Publication No. 2014-67949 proposes that a solid electrolyte layer containing a conductive polymer and a polyanion contains a predetermined amount of an alkali compound in order to obtain an electrolytic capacitor having a large electrostatic capacity and low ESR.

SUMMARY

An electrolytic capacitor according to an aspect of the present disclosure includes an anode body, a dielectric layer disposed on the anode body, and a solid electrolyte layer disposed on the dielectric layer. The solid electrolyte layer includes a conductive polymer, a polyanion, and an alkali component. The alkali component includes two or more kinds of alkali compound.

A method for manufacturing an electrolytic capacitor according to another aspect of the present disclosure includes the following first to third steps. In the first step, an anode body provided with a dielectric layer is prepared. In the second step, a liquid composition containing a conductive polymer, a polyanion, an alkali component, and one of a dispersion medium and a solvent is prepared. In the third step, a solid electrolyte layer is formed by bringing the liquid composition into contact with the dielectric layer. Here, the alkali component includes two or more kinds of alkali compound.

According to the present disclosure, there can be provided an electrolytic capacitor that is excellent in withstand voltage characteristics, and maintains low ESR even in high-temperature environments and a method for manufacturing the electrolytic capacitor.

BRIEF DESCRIPTION OF THE DRAWINGS

FIG. 1 is a schematic cross-sectional view illustrating an electrolytic capacitor according to one exemplary embodiment of the present disclosure.

DETAILED DESCRIPTION OF EMBODIMENT

In the electrolytic capacitor disclosed in Unexamined Japanese Patent Publication No. 2014-67949, depending on the type of alkali compound, withstand voltage characteristics may be degraded or ESR may be increased in high-temperature environments.

[Electrolytic Capacitor]

An electrolytic capacitor according to an exemplary embodiment of the present disclosure includes an anode body, a dielectric layer disposed on the anode body, and a solid electrolyte layer disposed on the dielectric layer. The solid electrolyte layer includes a conductive polymer, a polyanion (dopant), and an alkali component. The polyanion usually includes an anionic group, which is, for example, an acid group or its conjugated anionic group. Thus, the solid electrolyte layer tends to be acidic, and the dielectric layer is likely to be corroded. This may cause the withstand voltage characteristics to be degraded or ESR to increase. On the other hand, when the alkali component is included in the solid electrolyte layer, the corrosion of the dielectric layer due to the polyanion included in the solid electrolyte layer is suppressed. In the solid electrolyte layer, the conductive polymer and the polyanion are included as a conductive polymer composite. The conductive polymer composite refers to a conductive polymer doped with a polyanion or a conductive polymer bound to a polyanion.

As the alkali component, two or more kinds of alkali compound are used in combination. This improves the withstand voltage characteristics and maintains low ESR even in high-temperature environments. As two or more kinds of alkali compound, it is preferable to use an inorganic alkali compound and an organic alkali compound in combination. In this case, the withstand voltage characteristics can be enhanced as compared with a case of solely using the inorganic alkali compound or the organic alkali compound. Further, in this case, an increase in ESR in high-temperature environments can be also suppressed.

When the inorganic alkali compound is solely used, the withstand voltage characteristics may be degraded although the increase in ESR in high-temperature environments tends to be suppressed. When the organic alkali compound is solely used, the increase in ESR in high-temperature environments may not be sufficiently suppressed although the withstand voltage characteristics tend to be improved.

In contrast, as compared with the case where the organic alkali compound is solely used, when the inorganic alkali compound and the organic alkali compound are used in combination, the effect of suppressing the increase in ESR in high-temperature environments due to the inorganic alkali compound is obtained without impairing the effect of improving the withstand voltage characteristics due to the organic alkali compound. In some cases, the withstand voltage characteristics are further improved.

Further, as compared with the case where the inorganic alkali compound is solely used, when the organic alkali compound and the inorganic alkali compound are used in combination, the effect of improving the withstand voltage characteristics due to the organic alkali compound is obtained without impairing the effect of suppressing the increase in ESR in high-temperature environments due to the inorganic alkali compound. In some cases, the increase in ESR in high-temperature environments is further suppressed.

As the inorganic alkali compound, it is possible to use an ammonia, a hydroxide including an alkali metal such as sodium hydroxide or potassium hydroxide, a hydroxide including an alkaline earth metal such as calcium hydroxide, or the like. The inorganic alkali compounds may be used alone or in combination of two or more inorganic alkali compounds. Particularly, ammonia is preferred from the viewpoint of improving the withstand voltage characteristics and suppressing the increase in ESR in high-temperature environments.

An amine compound and the like are preferred as an organic alkali compound from the viewpoint of improving the withstand voltage characteristics and suppressing the increase in ESR in high-temperature environments. The amine compound may be any of a primary amine, a secondary amine, and a tertiary amine. As the amine compound, aliphatic amines, cyclic amines, and the like are preferred. The amine compounds may be used alone or in combination of two or more amine compounds. From the viewpoint of improving the withstand voltage characteristics and suppressing the increase in ESR in high-temperature environments, the amine compound is preferably an amine having an N—H bond.

Examples of the aliphatic amine include alkylamines such as ethylamine, diethylamine, triethylamine, N,N-dimethyloctylamine, and N,N-diethyloctylamine; alkanolamines such as ethanolamine, 2-ethylaminoethanol, dimethylaminoethanol, diethanolamine, triethanolamine, and dimethylaminoethoxyethanol; allylamines; and alkylenediamines such as N-ethylethylenediamine and 1,8-diaminooctane. Examples of the aliphatic amine include aminocyclohexane, diaminocyclohexane, and isophoronediamine. Examples of the aromatic amine include aniline and toluidine. From the viewpoint of improving the withstand voltage characteristics and suppressing the increase in ESR in high-temperature environments, alkylamines and alkanolamines are particularly preferred.

The cyclic amine is preferably a cyclic amine having a five-membered to eight-membered (preferably five-membered or six-membered) nitrogen-containing ring skeleton, such as pyrrole, imidazoline, imidazole, pyrazole, pyridine, pyrazine, pyrimidine or triazine. The cyclic amine may have one nitrogen-containing ring skeleton, or two or more (for example, two or three) nitrogen-containing ring skeletons. When the cyclic amine has two or more nitrogen-containing ring skeletons, the nitrogen-containing ring skeletons may be the same or different.

The amine compound may have a substituent as necessary.

It can be examined by, for example, gas chromatography (GC) whether the solid electrolyte layer includes an amine compound or not.

The conductive polymer is preferably, for example, polypyrrole, polythiophene, or polyaniline. These conductive polymers may be used alone or in combination of two or more conductive polymers, or the conductive polymer may be a copolymer of two or more monomers. In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives of polypyrrole, polythiophene, polyaniline, and the like, respectively. For example, polythiophene includes poly(3,4-ethylenedioxythiophene) (PEDOT) and the like.

A weight-average molecular weight of the conductive polymer is not particularly limited and ranges, for example, from 1,000 to 1,000,000, inclusive.

The polyanion has an anionic group such as a sulfonic acid group, a carboxy group, a phosphoric acid group or a phosphonic acid group. The polyanion may have one anionic group, or two or more anionic groups. As the anionic group, the sulfonate group is preferred, and a combination of the sulfonate group with an anionic group other than the sulfonate group is also acceptable.

Examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polyanions may be used alone or in combination of two or more polyanions. These polyanions may be a homopolymer or a copolymer of two or more monomers. Particularly, polystyrenesulfonic acid (PSS) is preferred.

A weight average molecular weight of the polyanion ranges, for example, from 1000 to 1,000,000, inclusive. Use of polyanion having such a molecular weight easily facilitates reduction of ESR.

An amount of the polyanion contained in the solid electrolyte layer ranges preferably from 10 parts by mass to 1,000 parts by mass, inclusive, with respect to 100 parts by mass of the conductive polymer.

The solid electrolyte layer may further include other components within a range not impairing the effects of the present disclosure.

(Anode Body)

The anode body includes a valve metal, an alloy containing a valve metal, and the like. As the valve metal, for example, aluminum, tantalum, niobium, or titanium is preferably used. The valve metals may be used alone or in combination of two or more valve metals. The anode body can be obtained by, for example, roughening a surface of a base material (such as a foil-like or plate-like base material) including a valve metal by etching or the like. Further, the anode body may be a molded body of particles including a valve metal or a sintered body of the molded body. The sintered body has a porous structure. That is, when the anode body is a sintered body, the whole anode body can be porous.

(Dielectric Layer)

The dielectric layer is formed by anodizing, through an anodizing treatment or the like, the valve metal on a surface of the anode body. The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. Note that dielectric layer is not limited to these examples, and any layer is acceptable as the dielectric layer as long as the layer functions as a dielectric body. When a surface of the anode body is porous, the dielectric layer is formed along the surface of the anode body (the surface including inner wall faces of holes or pits of the anode body).

FIG. 1 is a cross-sectional view schematically illustrating a configuration of an electrolytic capacitor according to one exemplary embodiment of the present disclosure. As shown in FIG. 1, electrolytic capacitor 1 includes capacitor element 2, resin sealing member 3 for sealing capacitor element 2, and anode terminal 4 and cathode terminal 5 each of which is at least partially exposed to the outside of resin sealing member 3. Anode terminal 4 and cathode terminal 5 can be made of, for example, metal such as copper or copper alloy. Resin sealing member 3 has an outer shape that is a substantially rectangular parallelepiped, and electrolytic capacitor 1 also has an outer shape that is a substantially rectangular parallelepiped. As a material of resin sealing member 3, for example, an epoxy resin can be used.

Capacitor element 2 includes anode body 6, dielectric layer 7 covering anode body 6, and cathode part 8 covering dielectric layer 7. Cathode part 8 includes solid electrolyte layer 9 covering dielectric layer 7 and cathode lead-out layer 10 covering solid electrolyte layer 9. Cathode lead-out layer 10 includes carbon layer 11 and silver paste layer 12.

Anode body 6 includes a region that faces cathode part 8 and a region that does not face cathode part 8. The region of anode body 6 that does not face cathode part 8 includes a part adjacent to cathode part 8. On the part adjacent to cathode part 8, insulating separation layer 13 is formed to zonally cover a surface of anode body 6, thereby preventing cathode part 8 and anode body 6 from being in contact with each other. In the region of anode body 6 that does not face cathode part 8, another part is electrically connected to anode terminal 4 by welding. Cathode terminal 5 is electrically connected to cathode part 8 via adhesive layer 14 made of a conductive adhesive.

A base material (such as a foil-like or plate-like base material) including a valve metal whose surface is roughened is used as anode body 6. For example, an aluminum foil whose surface is roughened by etching is used as anode body 6. Dielectric layer 7 includes, for example, an aluminum oxide such as $Al_2O_3$.

Main surface 4S of anode terminal 4 and main surface 5S of cathode terminal 5 are exposed from the same face of resin sealing member 3. These exposed surfaces are used for soldering connection with a substrate (not shown) on which electrolytic capacitor 1 is to be mounted.

It is sufficient if carbon layer 11 has conductivity, and carbon layer 11 can be configured, for example, by using a conductive carbon material such as graphite. For silver paste layer 12, for example, there can be used a composition containing a silver powder and a binder resin (such as an epoxy resin). A configuration of cathode lead-out layer 10 is not limited to this example, and it is sufficient if cathode lead-out layer 10 has a current collection function.

Solid electrolyte layer 9 is formed so as to cover dielectric layer 7. Solid electrolyte layer 9 does not necessarily cover whole (a whole surface of) dielectric layer 7, and is satisfactory as long as solid electrolyte layer 9 is formed to cover at least a part of dielectric layer 7.

Dielectric layer 7 is formed along a surface (a surface including inner wall faces of holes) of anode body 6. A surface of dielectric layer 7 is formed to have an irregular shape corresponding to a shape of the surface of anode body 6. Preferably, solid electrolyte layer 9 is formed so as to fill such irregularities of dielectric layer 7.

The electrolytic capacitor of the present disclosure is not limited to an electrolytic capacitor having the above structure and can be applied to electrolytic capacitors having various structures. Specifically, the present disclosure can also be applied to, for example, a wound electrolytic capacitor and an electrolytic capacitor including a metal powder sintered body as the anode body.

[Method for Manufacturing Electrolytic Capacitor]

A method for manufacturing an electrolytic capacitor according to an exemplary embodiment of the present disclosure includes a step (first step) of preparing an anode body formed with a dielectric layer, a step (second step) of preparing a liquid composition, and a step (third step) of forming a solid electrolyte layer by bringing the liquid composition into contact with the dielectric layer. The liquid composition contains a conductive polymer, a polyanion, an alkali component, and one of a dispersion medium and a solvent. The alkali component includes two or more kinds of alkali compound. The alkali component preferably includes an inorganic alkali compound and an organic alkali compound. The method for manufacturing the electrolytic capacitor may include a step of preparing an anode body prior to the first step. The manufacturing method may further include a step of forming a cathode lead-out layer.

Hereinafter, the steps will be described in more detail.

(Step of Preparing Anode Body)

In this step, the anode body is formed by a publicly known method according to a kind of the anode body.

The anode body can be prepared by, for example, roughening a surface of a foil-like or plate-like base material including a valve metal. In the roughening, it is sufficient if irregularities are formed on the base material surface. For example, roughening may be performed by etching (for example, electrolytic etching) the base material surface.

Alternatively, a valve metal powder is provided, and a molded body of the valve metal powder, which molded into a desired shape (for example, block-like shape), is obtained. The molded body is molded in a state where one end of a rod-like anode lead in a longitudinal direction is embedded in the valve metal powder. This molded body may be sintered to form an anode body of porous structure in which one end of the anode lead is embedded.

(Step of Forming Dielectric Layer)

In the first step, a dielectric layer is formed on an anode body. The dielectric layer is formed by anodizing the anode body through an anodizing treatment or the like. The anodizing can be performed by a publicly known method, for example, an anodizing treatment. The anodizing treatment can be performed by, for example, immersing the anode body in an anodizing solution to impregnate the surface of the anode body with the anodizing solution and applying a voltage between the anode body as an anode and a cathode immersed in the anodizing solution. It is preferable to use, for example, a phosphoric acid aqueous solution as the anodizing solution.

(Step of Preparing Liquid Composition)

In the second step, a liquid composition (first liquid composition) containing a conductive polymer, a polyanion (dopant), an alkali component, and one of a dispersion medium and a solvent is prepared. As the conductive polymer, the polyanion, and the alkali component, those exemplified above can be used. The liquid composition may further contain other components, if necessary.

In the liquid composition, the conductive polymer and the polyanion are contained as a conductive polymer composite in which the conductive polymer is doped with the polyanion or bound to the polyanion. The conductive polymer composite can be obtained, for example, by oxidative polymerization of a conductive polymer precursor in the presence of a dispersion medium (solvent) and a polyanion. Examples of the precursor of the conductive polymer include a monomer that constitutes the conductive polymer and/or an oligomer in which some monomers are linked to each other.

The liquid composition is, for example, a dispersion (solution) of a conductive polymer (composite). An average particle size of particles of the conductive polymer (composite) in the liquid composition ranges, for example, from 5 nm to 800 nm, inclusive. The average particle size of the conductive polymer composite can be obtained from, for example, particle size distribution by a dynamic light scattering method.

Examples of a dispersion medium (solvent) used for the liquid composition include water, organic solvent, and mixtures thereof. Examples of the organic solvent include monohydric alcohols such as methanol, ethanol and propanol, polyhydric alcohols such as ethylene glycol and glycerin, and aprotic polar solvents such as N, N-dimethylformamide, dimethylsulfoxide, acetonitrile, acetone, and benzonitrile.

An amount of the alkali component added in the liquid composition ranges preferably from 0.5 times to 1.2 times, inclusive, of a neutralization equivalent of the conductive polymer composite including the conductive polymer and the polyanion. In this case, the withstand voltage characteristics are further improved, and, at the same time, the increase in ESR in high-temperature environments is further suppressed. The amount of the alkali component described above is expressed as a ratio (times) to an amount of the alkali component required for neutralizing the conductive polymer composite. For example, 0.5 times of the neutralization equivalent of the conductive polymer composite means an amount (molar amount) corresponding to 50% of the amount of the alkali component required for neutralizing the conductive polymer composite. The neutralization equivalent of the conductive polymer composite can be obtained from a titration amount of an alkali component at an inflection point of a neutralization titration curve, which is obtained by subjecting the conductive polymer composite to neutralization titration using the alkali component.

An amount of the organic alkali compound added in the liquid composition is preferably less than 0.6 times, more preferably less than or equal to 0.55 times, further preferably ranges from 0.35 times to 0.55 times, inclusive, of the neutralization equivalent of the conductive polymer composite containing the conductive polymer and the polyanion. In this case, the withstand voltage characteristics are further improved, and, at the same time, the increase in ESR in high-temperature environments is further suppressed. pH of the liquid composition is preferably less than 8, more preferably more than or equal to 3 and less than 5. In this case, the withstand voltage characteristics are further improved, and, at the same time, the increase in ESR in high-temperature environments is further suppressed. In addition, corrosion of the dielectric layer is satisfactorily suppressed.

(Step of Forming Solid Electrolyte Layer)

In the third step, a solid electrolyte layer is formed to cover at least a part of the dielectric layer. In the third step, the liquid composition (first liquid composition) prepared above is deposited on the dielectric layer to form a solid electrolyte layer (first conductive polymer layer). The step of forming the solid electrolyte layer includes, for example, a step (a) of immersing the anode body formed with the dielectric layer in the liquid composition or applying or dropping the liquid composition onto the anode body formed with the dielectric layer, and thereafter drying the liquid composition. The step (a) may be repeated plural times. When the step (a) is repeated plural times, it is sufficient if a step of using the first liquid composition containing an alkali component at least once is included, and a step of using another liquid composition containing no alkali component (the first liquid composition from which the alkali component has been removed) may be included. Depending on the step, the amount of the alkali component in the liquid composition used may be changed.

In the step of forming the solid electrolyte layer, after the first conductive polymer layer is further formed, the second liquid composition may be deposited on the first conductive polymer layer to form a second conductive polymer layer. The step of forming the solid electrolyte layer may include, for example, a step (b) of immersing the first conductive polymer layer in the second liquid composition or applying or dropping the second liquid composition onto the first conductive polymer layer, and thereafter drying the second liquid composition. The step (b) may be repeated plural times. In this case, a solid electrolyte layer including the first conductive polymer layer and the second conductive polymer layer can be formed.

The second liquid composition contains a conductive polymer, a polyanion, and a dispersion medium (solvent). As the conductive polymer, the polyanion, and the dispersion medium (solvent) used in the second liquid composition, those exemplified above can be used. In the second liquid composition, each material such as a conductive polymer to be used may be the same as or different from each material in the first liquid composition. The second liquid composition may or may not contain an alkali component.

In order to form a solid electrolyte layer (second conductive polymer layer) with a sufficient thickness, the average particle size of particles of a conductive polymer (composite) used in the second conductive polymer layer is preferably larger than the average particle size of particles of a conductive polymer (composite) used in the first conductive polymer layer. The second liquid composition having a higher concentration in solid component of the conductive polymer (composite) than a concentration in solid component of the conductive polymer (composite) of the first liquid composition may be used, and a number of steps (b) may be increased.

(Step of Forming Cathode Lead-Out Layer)

In this step, a cathode lead-out layer is formed by sequentially stacking a carbon layer and a silver paste layer on the surface (preferably of the solid electrolyte layer formed) of the anode body obtained in the third step.

EXAMPLES

Hereinafter, the present disclosure is specifically described with reference to examples and comparative examples. The present disclosure, however, is not limited to the examples below.

Example 1

Electrolytic capacitor 1 shown in FIG. 1 was fabricated in the manner described below, and characteristics of the electrolytic capacitor were evaluated.

(1) Step of Preparing Anode Body

An aluminum foil (with a thickness of 100 μm) was prepared as a base material, and etching was performed on a surface of the aluminum foil, to obtain anode body 6.

(2) Step of Forming Dielectric Layer

Anode body 6 was immersed in a phosphate acid solution in a concentration of 0.3% by mass (at a liquid temperature of 70° C.), and a DC voltage of 70 V was applied for 20 minutes, thereby forming dielectric layer 7 containing an aluminum oxide ($Al_2O_3$) on a surface of anode body 6. After that, an insulating resist tape (separation layer 13) was attached at a prescribed position of anode body 6.

(3) Step of Forming First Conductive Polymer Layer

A PEDOT/PSS aqueous dispersion liquid (in a concentration of 2% by mass, with an average particle size of 400 nm of PEDOT/PSS particles) was prepared as a dispersion liquid of a conductive polymer composite. An alkaline component was added to this dispersion liquid to prepare a first liquid composition. As the alkali component, a combination of an inorganic alkali compound and an organic alkali compound was used. Ammonia was used as the inorganic alkali compound, and diethylamine was used as the organic alkali compound.

An ammonia aqueous solution (in a concentration of 30% by mass) was used for addition of ammonia, and an addition amount of the ammonia aqueous solution was 0.11 parts by mass with respect to 100 parts by mass of the PEDOT/PSS aqueous dispersion liquid. That is, an addition amount of ammonia was 0.41 times of a neutralization equivalent of PEDOT/PSS. An addition amount of diethylamine was 0.18 parts by mass with respect to 100 parts by mass of the PEDOT/PSS aqueous dispersion liquid. That is, the addition amount of diethylamine was 0.59 times of the neutralization equivalent of PEDOT/PSS.

A value of an addition amount of the alkali compound shown in Table 1 indicates an amount (parts by mass) with respect to 100 parts by mass of the PEDOT/PSS aqueous dispersion liquid (in a concentration of 2% by mass) used for forming the first conductive polymer layer. When the inorganic alkali compound is ammonia, the addition amount of ammonia is shown as an addition amount of ammonia water (in a concentration of 30% by mass). pH of the first liquid composition (25° C.) was 3.4. The pH of the first liquid composition was similarly measured for Examples and Comparative Examples described later.

After anode body 6 formed with dielectric layer 7 was immersed in the first liquid composition, a step of drying the first liquid composition at 120° C. for 10 to 30 minutes was repeated twice to form a first conductive polymer layer.

(4) Step of Forming Second Conductive Polymer Layer

The anode body formed with the first conductive polymer layer was immersed in a second liquid composition (PEDOT/PSS aqueous dispersion liquid, in a concentration of 4% by mass, with an average particle size of 600 nm of PEDOT/PSS particles), and thereafter a step of drying the second liquid composition at 120° C. for 10 to 30 minutes was repeated four times, thereby forming a second conductive polymer layer.

Thus, solid electrolyte layer 9 made up of the first conductive polymer layer and the second conductive polymer layer was formed.

(5) Step of Forming Cathode Lead-Out Layer

A dispersion liquid obtained by dispersing graphite particles in water was applied to a surface of solid electrolyte layer 9, and was then dried in air to form carbon layer 11 on a surface of a third conductive polymer layer.

Then, a silver paste containing silver particles and a binder resin (epoxy resin) was applied onto a surface of carbon layer 11, and thereafter, the binder resin was cured by heating to form silver paste layer 12. In this manner, cathode lead-out layer 10 constituted of carbon layer 11 and silver paste layer 12 was formed. Thus, capacitor element 2 was obtained.

(7) Assembling of Electrolytic Capacitor

Anode terminal 4, cathode terminal 5, and adhesive layer 14 were disposed on capacitor element 2 and were sealed with resin sealing member 3, thereby manufacturing an electrolytic capacitor.

Examples 2 to 4

Compounds shown in Table 1 were used as the inorganic alkali compound and the organic alkali compound.

The addition amounts of the inorganic alkali compound and the organic alkali compound were values shown in Table 1. That is, the addition amount of the inorganic alkali compound was 0.41 times of the neutralization equivalent of PEDOT/PSS. The addition amount of the organic alkali compound was 0.59 times of the neutralization equivalent of PEDOT/PSS.

An electrolytic capacitor was produced in the same manner as in Example 1 except for the above.

Comparative Example 1

In the preparation of the first liquid composition, an electrolytic capacitor was produced in the same manner as in Example 1 except that no alkali component was added.

Comparative Examples 2 to 9

As the alkali component, an inorganic alkali compound or an organic alkali compound shown in Table 1 was used.

The addition amount of the inorganic alkali compound or the organic alkali compound was a value shown in Table 1. That is, in Comparative Example 2, the addition amount of the organic alkali compound was 1.00 time of the neutralization equivalent of PEDOT/PSS. In Comparative Examples 3 and 4, the addition amount of the inorganic alkali compound was 1.00 time of the neutralization equivalent of PEDOT/PSS. In Comparative Examples 5 to 9, the addition amount of the inorganic alkali compound or the organic alkali compound was 0.59 times of the neutralization equivalent of PEDOT/PSS.

An electrolytic capacitor was produced in the same manner as in Example 1 except for the above.

The electrolytic capacitors of Examples and Comparative Examples produced above were evaluated as follows.

[Evaluation]

(a) Withstand Voltage Characteristics

A voltage of the electrolytic capacitor was increased at a rate of 1 V/s, and a voltage value (V) was measured at a time when a current value exceeded 0.5 A. The measured voltage value was calculated as a relative value when a voltage value of Comparative Example 2 was 100, and defined as an evaluation index for withstand voltage characteristics. Withstand voltage characteristics are improved as the voltage value increases.

(b) Measurement of ESR

First, an ESR value (mΩ) at a frequency of 100 kHz was measured as an initial ESR value ($X_0$) in an environment at 20° C. for the electrolytic capacitor with an LCR meter for 4-terminal measurement. Further, in order to evaluate stability of ESR in high-temperature environments, a rated voltage was applied to the electrolytic capacitor at a temperature of 145° C. for 125 hours, and then an ESR value ($X_1$) (mΩ) was measured by the same method as described above. Then, ESR(R) was calculated by the following formula.

$$ESR(R) = (X_1/X_0) \times 100$$

Table 1 shows the evaluation results.

TABLE 1

| | Liquid composition | | | | Evaluation | | |
|---|---|---|---|---|---|---|---|
| | Inorganic alkali compound | | Organic alkali compound | | | | |
| | Type | Addition amount (part(s) by mass) | Type | Addition amount (part(s) by mass) | pH | ESR(R) | Withstand voltage characteristics |
| Comparative Example 1 | — | — | — | — | 1.7 | 232 | 90.8 |
| Comparative Example 2 | — | — | Diethylamine | 0.31 | 3.8 | 135 | 100.0 |
| Comparative Example 3 | Ammonia | 0.27 | — | — | 4.3 | 128 | 79.8 |
| Comparative Example 4 | Sodium hydroxide | 0.17 | — | — | 4.8 | 151 | 84.5 |
| Comparative Example 5 | Ammonia | 0.16 | — | — | 2.2 | 142 | 80.7 |
| Comparative Example 6 | — | — | Diethylamine | 0.18 | 2.1 | 172 | 101.7 |
| Comparative Example 7 | — | — | Triethylamine | 0.26 | 2.3 | 150 | 90.4 |
| Comparative Example 8 | — | — | Dimethylaminoethanol | 0.23 | 2.3 | 157 | 85.3 |
| Comparative Example 9 | — | — | Dimethylaminoethoxyethanol | 0.34 | 2.3 | 158 | 91.9 |
| Example 1 | Ammonia | 0.11 | Diethylamine | 0.18 | 3.4 | 125 | 103.0 |
| Example 2 | Ammonia | 0.11 | Triethylamine | 0.26 | 3.6 | 137 | 89.9 |
| Example 3 | Ammonia | 0.11 | Dimethylaminoethanol | 0.23 | 3.6 | 140 | 85.1 |
| Example 4 | Ammonia | 0.11 | Dimethylaminoethoxyethanol | 0.34 | 3.5 | 135 | 87.2 |

In Examples 1 to 4, ESR was low after being left at high temperature, and high withstand voltage characteristics were exhibited. In Comparative Examples 3 to 5 in which the inorganic alkali compound was solely used, the withstand voltage characteristics decreased.

In Example 1 in which ammonia and diethylamine were used in combination, ESR after being left at high temperature was lower than ESR in Comparative Examples 3 and 5 in which ammonia was solely used and Comparative Examples 2 and 6 in which diethylamine was solely used, and high withstand voltage characteristics were exhibited.

In Examples 2 to 4 in which ammonia and various organic alkali compounds were used in combination, as compared with Comparative Examples 7 to 9 in which various organic alkali compounds were solely used, ESR after being left at high temperature was reduced without impairing the withstand voltage characteristics.

The electrolytic capacitor according to the present disclosure can be used for various uses in which excellent withstand voltage characteristics and maintenance of low ESR in high-temperature environments are required.

What is claimed is:

1. An electrolytic capacitor comprising:
   an anode body;
   a dielectric layer disposed on the anode body; and
   a solid electrolyte layer disposed on the dielectric, layer,
   wherein:
   the solid electrolyte layer includes a conductive polymer, a polyanion, and an alkali component,
   the alkali component includes two or more kinds of alkali compound,
   the two or more kinds of alkali compound include an inorganic alkali compound and an organic alkali compound, and
   the organic alkali compound includes at least one selected from a group consisting of an aliphatic amine and a cyclic amine.

2. The electrolytic capacitor according to claim 1, wherein the inorganic alkali compound includes at least one selected from a group consisting of ammonia, sodium hydroxide, potassium hydroxide, and calcium hydroxide.

3. The electrolytic capacitor according to claim 1, wherein the organic alkali compound includes an aliphatic amine.

4. The electrolytic capacitor according to claim 1, wherein the inorganic alkali compound includes ammonia.

5. The electrolytic capacitor according to claim 4, wherein the organic alkali compound includes diethylamine.

* * * * *